(No Model.)
J. A. ERVIEN.
FORK FOR DIGGING VEGETABLES.
No. 316,347. Patented Apr. 21, 1885.
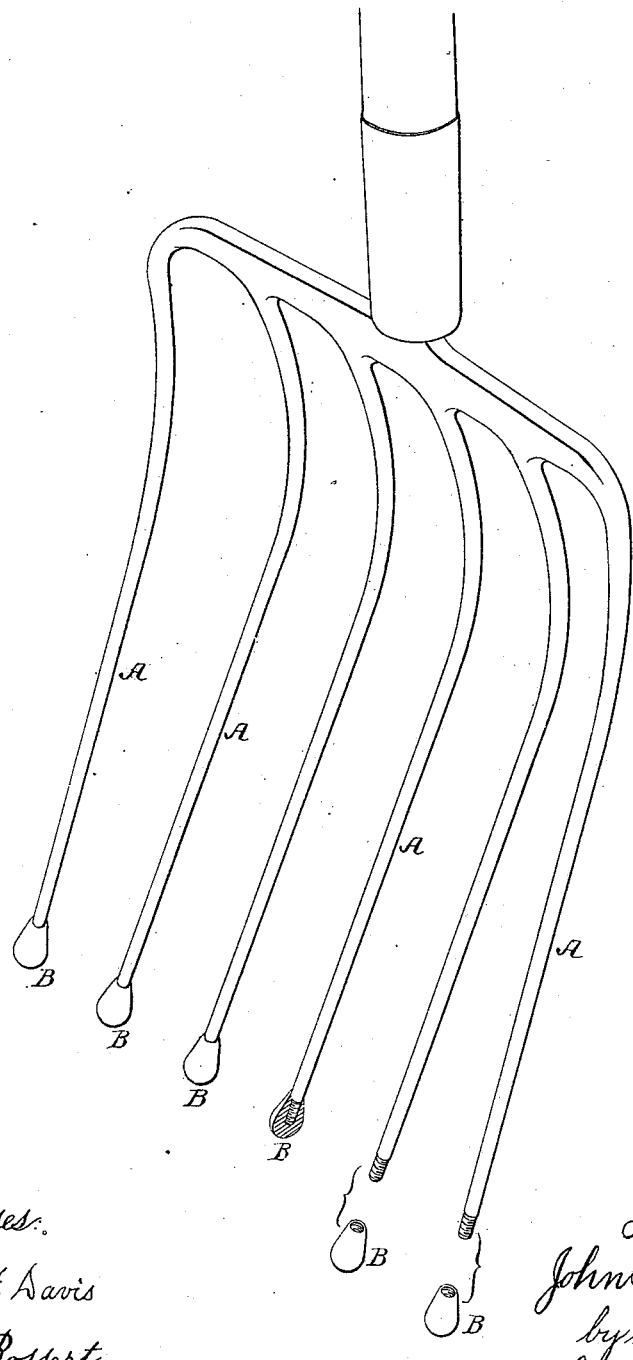
Witnesses:
William F. Davis
Henry Bossert
Inventor:
John A. Ervien
by his Attorneys
Howson & Son

UNITED STATES PATENT OFFICE.

JOHN A. ERVIEN, OF SHOEMAKERTOWN, PENNSYLVANIA.

FORK FOR DIGGING VEGETABLES.

SPECIFICATION forming part of Letters Patent No. 316,347, dated April 21, 1885.

Application filed March 23, 1885. (No model.)

*To all whom it may concern:*

Be it known that I, JOHN A. ERVIEN, a citizen of the United States, and a resident of Shoemakertown, Montgomery county, Pennsylvania, have invented certain Improvements in Forks for Digging Vegetables, of which the following is a specification.

My invention consists of an improvement in the construction of forks for digging and handling beets, potatoes, and other vegetables.

The figure in the accompanying drawing is a perspective view, partly in section, of sufficient of a fork to illustrate my improvement.

Forks for digging or handling beets, potatoes, and other vegetables have been provided with tines having enlarged ends, in order to prevent the stabbing of the vegetables in digging them from the ground or otherwise handling them; but, so far as I am aware, these enlargements have been formed on the ends of the tines by forging. This always gives more or less unsuccessful results in making the fork, for it is very difficult to forge the tines of the proper length to bring their points in line on forming these knobs, and the formation of the enlargements by forging is, moreover, a matter of considerable difficulty, and it is almost impossible even with the best skilled labor to get the enlargements of anything like uniform shape and size. I meet this difficulty by making the enlargements separately and applying them to the ends of the tines. I preferably turn the separate knobs or enlargements and screw-thread them onto the points of the tines, as shown in the drawing, in which A A are the tines of a fork, and B B are the separate knobs which form the enlargements.

In making the fork, after the tines have all been forged I form a screw-thread on the end of each, and I tap a threaded hole in each of the turned knobs corresponding with the thread formed on the end of the tine, so that the knobs can be quickly and easily screwed into place. In this manner I can produce a fork with tines having enlarged ends much more cheaply than by forging, and the fork thus produced will have its tines all of the proper length, and its enlargements of uniform shape and size, and with properly rounded ends.

I claim as my invention—

1. The within-described fork for digging or handling vegetables, said fork having tines provided with separately-made knobs applied to their ends, substantially as described.

2. The within-described fork for digging or handling vegetables, said fork having tines with threaded ends and tapped knobs applied thereto, substantially as described.

In testimony whereof I have signed my name to this specification in the presence of two subscribing witnesses.

JOHN A. ERVIEN.

Witnesses:
HENRY BOSSERT,
HARRY SMITH.